United States Patent
Werz et al.

(10) Patent No.: US 6,926,282 B2
(45) Date of Patent: Aug. 9, 2005

(54) CYLINDER HEAD GASKET

(75) Inventors: Ulrich Werz, Dettingen (DE); Frank Schmucker, Ehingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 10/392,107

(22) Filed: Mar. 19, 2003

(65) Prior Publication Data

US 2003/0197334 A1 Oct. 23, 2003

(30) Foreign Application Priority Data

Mar. 28, 2002 (DE) .......................................... 102 13 900

(51) Int. Cl.$^7$ ............................................. F02F 11/00
(52) U.S. Cl. ....................... 277/591; 277/592; 277/593; 277/595
(58) Field of Search ................................ 277/591–595

(56) References Cited

U.S. PATENT DOCUMENTS

| | | | | |
|---|---|---|---|---|
| 5,286,039 A | * | 2/1994 | Kawaguchi et al. | 277/593 |
| 5,743,537 A | | 4/1998 | Yamada | 277/236 |
| 5,927,724 A | * | 7/1999 | Maschmann et al. | 277/593 |
| 5,988,651 A | | 11/1999 | Miyaoh | 277/593 |
| 6,126,172 A | | 10/2000 | Okano | 277/593 |
| 6,135,459 A | * | 10/2000 | Hiramatsu et al. | 277/593 |
| 6,182,976 B1 | * | 2/2001 | Maekawa et al. | 277/593 |
| 6,450,504 B2 | * | 9/2002 | Bleidt et al. | 277/592 |
| 2002/0153666 A1 | * | 10/2002 | Unseld | 277/593 |

FOREIGN PATENT DOCUMENTS

| | | |
|---|---|---|
| DE | 19513361 | 6/1996 |
| DE | 20018433 | 2/2001 |

* cited by examiner

*Primary Examiner*—Enoch Peavey

(57) ABSTRACT

In order to provide a cylinder head gasket, comprising at least one beaded gasket sheet, which comprises at least one combustion chamber opening and a bead, which may be vertically deformed and surrounds the combustion chamber opening, and at least one deformation limiting means adjacent to the bead, which can be produced simply and with low material usage and which is flexible with respect to the arrangement and configuration of the deformation limiting means, it is proposed that the deformation limiting means comprises at least one deformation limiting element disposed on a deformation limiting sheet of the cylinder head gasket, said element having at least one reinforcement region, which is located at a distance from the combustion chamber opening and is formed by separating a region of the deformation limiting sheet along a separating line and subsequently bending this region out of the plane of the deformation limiting sheet.

35 Claims, 10 Drawing Sheets

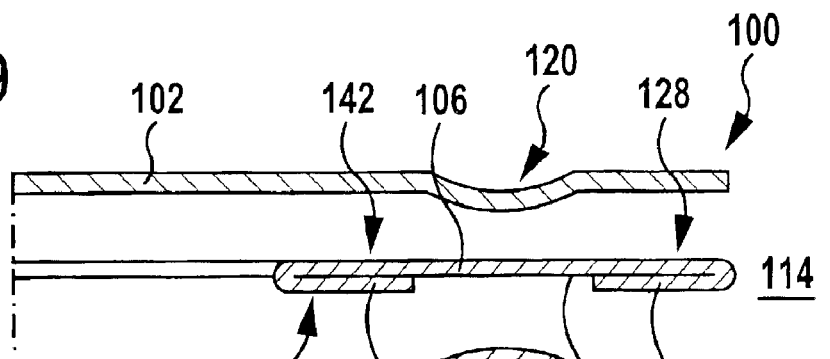
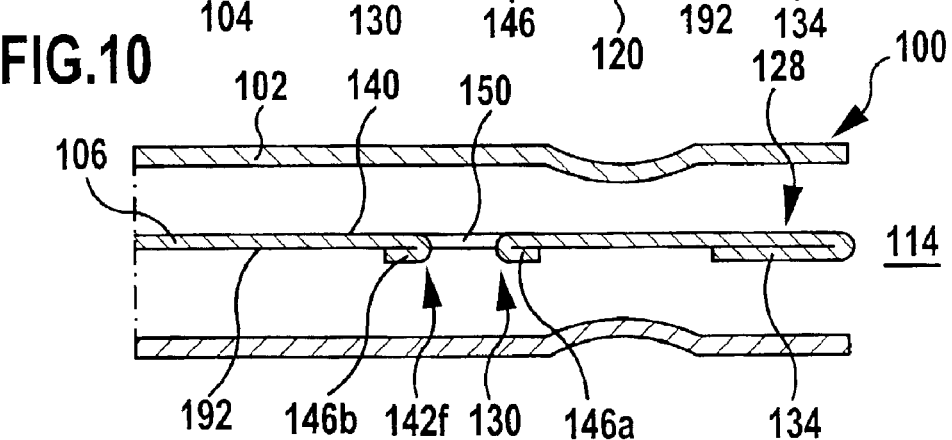
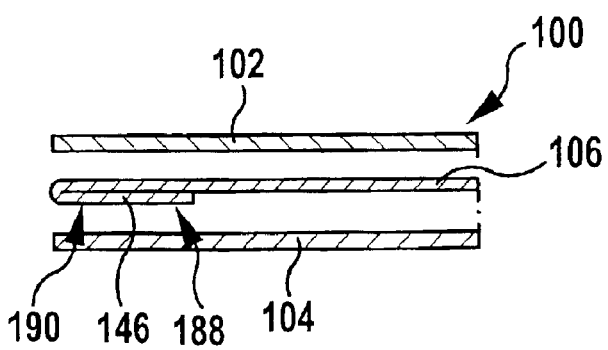
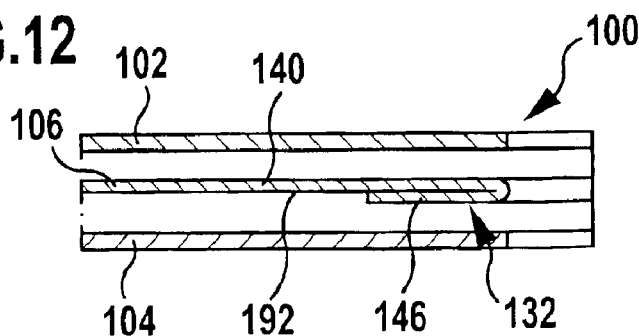

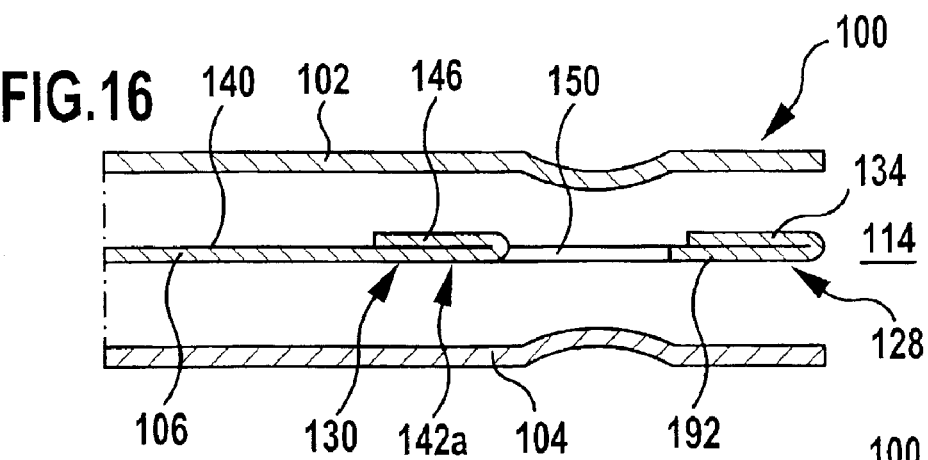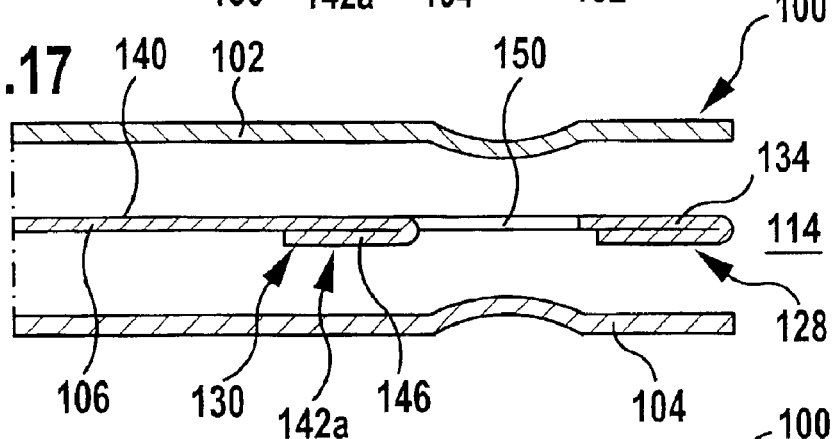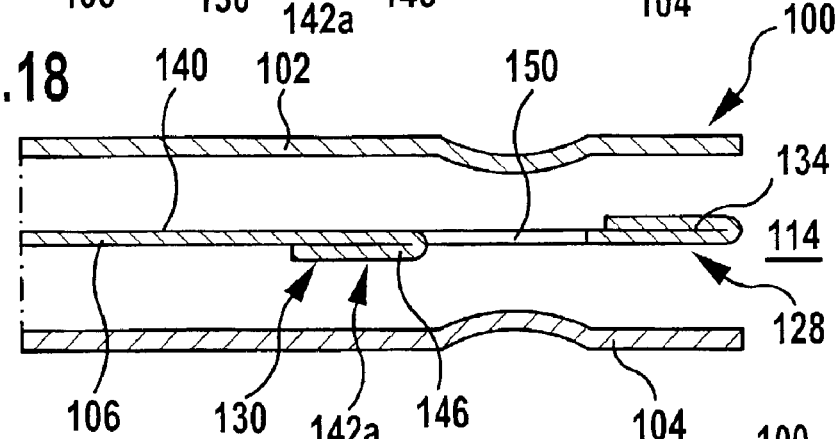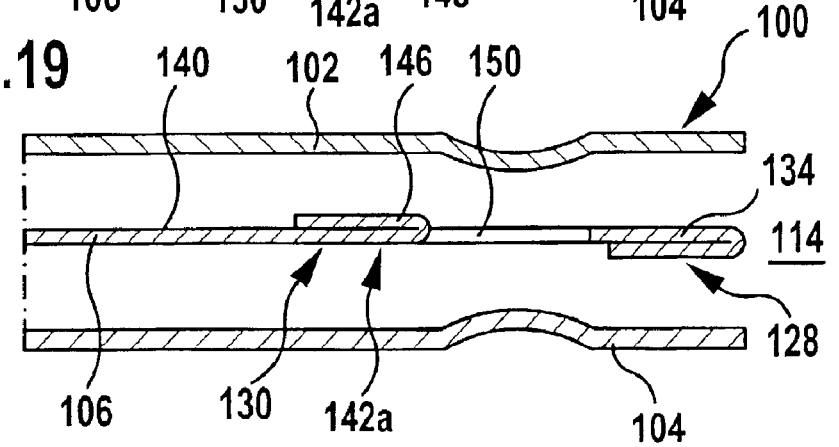

CYLINDER HEAD GASKET

The present disclosure relates to the subject matter disclosed in German Patent Application No. 102 13 900.8 of Mar. 28, 2002, the entire specification of which is incorporated herein by reference.

The present invention relates to a cylinder head gasket, which comprises at least one beaded gasket sheet, which comprises at least one combustion chamber opening and a bead, which may be vertically deformed and surrounds the combustion chamber opening, and at least one deformation limiting means adjacent to the bead.

Such a cylinder head gasket is known, for example, from DE 195 13 361 C1.

For each combustion chamber opening, the cylinder head gasket known from DE 195 13 361 C1 has a respective inner deformation limiting means, which is provided directly on the combustion chamber opening and is formed by folding over the edge of the combustion chamber opening, as well as an outer deformation limiting means, which is disposed radially outside the bead surrounding the combustion chamber opening and is formed by additional deformation limiting rings welded onto a support plate.

The vertically deformable beads surrounding the combustion chamber openings of the cylinder head gasket are protected against an impermissibly large deformation as a result of these deformation limiting means—also called stoppers. At the same time, the deformation limiting means constitute partially thickened sections of the cylinder head gasket, as a result of which the engine components adjoining the cylinder head gasket are so prestressed that the dynamic sealing gap oscillation is reduced.

The disadvantage with the known cylinder head gaskets is that their deformation limiting means can be disposed either only directly on the combustion chamber opening (folded flange on the combustion chamber opening) or cause an increase in use of material and an additional production step for connecting the deformation limiting means to a support plate (additional deformation limiting ring).

Therefore, the object of the present invention is to provide a cylinder head gasket of the aforementioned type, which can be produced simply and with low material usage and which is flexible with respect to the arrangement and configuration of the deformation limiting means.

This object is achieved in accordance with the invention in a cylinder head gasket with the features of the preamble of Claim 1 in that the deformation limiting means comprises at least one deformation limiting element disposed on a deformation limiting sheet of the cylinder head gasket, said element having at least one reinforcement region, which is located at a distance from the combustion chamber opening and is formed by separating a region of the deformation limiting sheet along a separating line and subsequently bending this region out of the plane of the deformation limiting sheet.

Therefore, in the case of the solution according to the invention, the material for the reinforcement region of the deformation limiting element is taken from the deformation limiting sheet itself, and therefore no additional material needs to be used besides the deformation limiting sheet, which reduces the use of material for the cylinder head gasket according to the invention.

Moreover, the reinforcement region of the deformation limiting element bent out of the plane of the deformation limiting sheet remains connected to the deformation limiting sheet along the bending line, along which it is bent out of the plane of the deformation limiting sheet, so that it is not necessary to connect the reinforcement region to the deformation limiting sheet by an additional production step, e.g. a welding process. As a result, the time and equipment expenditure for production of the cylinder head gasket as well as the energy expenditure necessary for this are reduced.

The separation of a region of the deformation limiting sheet along a separating line and the subsequent bending of this region out of the plane of the deformation limiting sheet along a bending line is possible at any desired location of the deformation limiting sheet, so that the deformation limiting elements of the deformation limiting means can be disposed at any desired location of the deformation limiting sheet and therefore the deformation limiting means can be very flexible in structure.

In a preferred configuration of the cylinder head gasket according to the invention it is provided that the reinforcement region of the at least one deformation limiting element is oriented substantially parallel to the plane of the deformation limiting sheet.

It is preferably provided that the reinforcement region of the at least one deformation limiting element abuts, preferably flat, against one of the main surfaces of the deformation limiting sheet. Such a reinforcement region can be produced in a simple manner by folding over the region bent out of the plane of the deformation limiting sheet onto the upper or underside of the deformation limiting sheet.

In order to prevent a shearing off of the reinforcement region folded over onto the deformation limiting sheet, it can be provided that reinforcement region is connected, e.g. by welding or gluing, to the abutting region of the deformation limiting sheet.

The reinforcement region of the at least one deformation limiting element can be bent out of the plane of the deformation limiting sheet towards the cylinder head side of the deformation limiting sheet.

Alternatively, it is also possible that the reinforcement region of the at least one deformation limiting element is bent out of the plane of the deformation limiting sheet towards the engine block side of the deformation limiting sheet.

If the deformation limiting sheet has several reinforcement regions, which can be associated with a single deformation limiting element or several deformation limiting elements, then it can also be provided that at least one reinforcement region of a deformation limiting element is bent out of the plane of the deformation limiting sheet towards the cylinder head side and at least one further reinforcement region is bent out of the plane of the deformation limiting sheet towards the engine block side of the deformation limiting sheet.

The deformation limiting sheet of the cylinder head gasket according to the invention can be identical to the beaded gasket sheet. In this case, the deformation limiting elements of the deformation limiting means are disposed on the same sheet of the gasket as the bead protected by the deformation limiting means.

In a preferred configuration of the invention it is provided, however, that the deformation limiting sheet is a different gasket sheet of the cylinder head gasket from the beaded gasket sheet. As a result, it is possible in particular to produce the gasket sheet and the deformation limiting sheet from different materials and with different material thicknesses, so that the selected material and the selected material thickness can be optimised for the respective purpose of use.

Therefore, it is possible in particular to use a metallic material for the deformation limiting sheet that has a lower tensile strength than a metallic material used for the beaded gasket sheet.

In addition, it can be provided that a further gasket sheet of the cylinder head gasket is disposed between the deformation limiting sheet and the beaded gasket sheet. This further gasket sheet can serve in particular as spacer sheet to adjust the total thickness of the cylinder head gasket to a desired value.

However, a spacer sheet of the cylinder head gasket can also form an outer sheet of the gasket, which can be disposed on the engine block side or on the cylinder head side.

In this case it can be provided that the reinforcement region of the at least one deformation limiting element is bent out of the plane of the deformation limiting sheet towards the side of the deformation limiting sheet remote from the further gasket sheet of the cylinder head gasket.

However, it is preferably provided that the reinforcement region of the at least one deformation limiting element is bent out of the plane of the deformation limiting sheet towards the side of the deformation limiting sheet facing the further gasket sheet of the cylinder head gasket. As a result of this, when the cylinder head gasket is installed, the free edge of the reinforcement region separated from the deformation limiting sheet comes into abutment against the further gasket sheet, which in particular can be in the form of a spacer sheet, and not against the beaded gasket sheet or against the engine components adjoining the cylinder head gasket, thus excluding the possibility of damage to the beaded gasket sheet and the engine components adjoining the cylinder head gasket during operation of the cylinder head gasket.

The at least one deformation limiting element can be disposed on the side of the bead remote from the combustion chamber opening or on the side of the bead facing the combustion chamber opening.

Preferably, the at least one deformation limiting element is disposed on the side of the bead remote from the combustion chamber opening.

To enable the bead surrounding the combustion chamber opening to be protected against impermissible deformation along its entire length, it is of advantage if the deformation limiting means comprises a plurality of deformation limiting elements, which are arranged consecutively in the peripheral direction of the combustion chamber opening.

In this case, two respective deformation limiting elements arranged consecutively in the peripheral direction of the combustion chamber opening can be separated from one another by a web of the deformation limiting sheet disposed between them.

In order to prevent shearing movements in the web region located between two consecutive deformation limiting elements, it is advantageous to mechanically disconnect the region located radially outside the deformation limiting means formed by the deformation limiting elements from the region of the deformation limiting sheet located radially inside the deformation limiting means.

This disconnection can be achieved, for example, if in the region between two deformation limiting elements arranged consecutively in the peripheral direction of the combustion chamber opening, the deformation limiting sheet is connected, preferably by welding, to a different gasket sheet of the cylinder head gasket, e.g. the beaded gasket sheet.

Alternatively or in addition hereto, for disconnection of the regions of the deformation limiting sheet lying radially outside and radially inside the deformation limiting means, it is possible to provide the deformation limiting sheet with a stamping, preferably with a bead, in the region between two deformation limiting elements arranged consecutively in the peripheral direction of the combustion chamber opening.

The deformation limiting means of the cylinder head gasket formed by the at least one deformation limiting element can be an outer deformation limiting means, which is disposed radially outside the bead to the protected or an inner deformation limiting means, which is disposed radially inside the bead to be protected.

In a preferred configuration of the invention, it is provided that the cylinder head gasket comprises both an outer deformation limiting means and an inner deformation limiting means.

In this case, the outer deformation limiting means and the inner deformation limiting means can be disposed on different sheets of the cylinder head gasket.

However, it is preferably provided that the outer deformation limiting means and the inner deformation limiting means are both disposed on the same deformation limiting sheet.

The deformation limiting elements of the outer deformation limiting means and the inner deformation limiting means project above the respectively adjoining regions of the deformation limiting sheet towards the same side of the deformation limiting sheet.

Alternatively, it is also possible that the deformation limiting elements of the outer deformation limiting means and the inner deformation limiting means project above the respectively adjoining regions of the deformation limiting sheet towards different sides of the deformation limiting sheet.

In a preferred configuration of the invention, it is provided that the inner deformation limiting means comprises a deformation limiting element, which has a reinforcement region, which adjoins the combustion chamber opening of the deformation limiting sheet and is formed by bending the edge region of the combustion chamber opening out of the plane of the deformation limiting sheet. Such a reinforcement region configured as a folded flange can be produced particularly simply.

The reinforcement regions of the deformation limiting elements can be bent radially inwards, i.e. towards the combustion chamber opening of the deformation limiting sheet, or radially outwards, i.e. away from the combustion chamber opening of the deformation limiting sheet, out of the plane of the deformation limiting sheet.

If the reinforcement region of the deformation limiting element is bent radially inwards along a curved bending line, then at least one recess is preferably formed (for example, by punching out) on the edge of the reinforcement region remote from the combustion chamber opening before the bending out in order to reduce or completely prevent fold formation when the reinforcement region is bent out and possibly folded over.

In addition, it can be provided that the reinforcement region is provided with at least one stamping, the stamping depth of which decreases from the edge of the reinforcement region remote from the combustion chamber opening prior to being bent out towards the bending line.

In a special configuration of the invention it is provided that the deformation limiting means comprises a plurality of deformation limiting elements, which are disposed consecutively in the peripheral direction of the combustion chamber opening, wherein the reinforcement regions of the deformation limiting elements are bent out of the plane of the deformation limiting sheet alternately towards the combustion chamber opening (radially inwards) and away from the combustion chamber opening (radially outwards).

The deformation limiting elements according to the invention can respectively comprise one or more reinforcement regions.

In particular, it can be provided that at least one deformation limiting element has several reinforcement regions, which are bent out of the plane of the deformation limiting sheet in different directions.

In order to prevent tearing of the deformation limiting sheet at the end points of the separating line of a reinforcement region, it is advantageous if the separating line of at least one reinforcement region continues into a region of the deformation limiting sheet that is not bent out of the plane of the deformation limiting sheet.

Moreover, tearing of the deformation limiting sheet can also be prevented if the separating line of at least one reinforcement region is closed in a ring shape and the region of the deformation limiting sheet surrounded by the separating line has been separated from the deformation limiting sheet. Such a separating line closed in a ring shape has no end points, at which the deformation limiting sheet could tear.

An opening is formed in the deformation limiting sheet as a result of the reinforcement region being bent out of the plane of the deformation limiting sheet.

In special configurations of the cylinder head gasket according to the invention it can be provided that the opening formed by the reinforcement region of the at least one deformation limiting element being bent out of the plane of the deformation limiting sheet forms part of a larger opening in the deformation limiting sheet.

This opening can, for example, be a fastening element opening or a fluid opening for passage of a coolant or a lubricant through the cylinder head gasket.

However, the opening adjacent to the deformation limiting element may also be provided only for the purpose of forming the deformation limiting element and have no further function.

Further deformation limiting means may also be provided on the cylinder head gasket according to the invention besides the deformation limiting means for the bead surrounding the combustion chamber opening of the cylinder head gasket.

Hence, in a preferred configuration of the cylinder head gasket it is provided that besides the combustion chamber opening or besides the combustion chamber openings, the cylinder head gasket comprises at least one further opening, that at least one gasket sheet of the cylinder head gasket is provided with an additional bead surrounding the further opening and that the cylinder head gasket comprises an additional deformation limiting means for the additional bead.

The additional deformation limiting means is preferably likewise disposed on the deformation limiting sheet.

It is additionally favourable if the additional deformation limiting means comprises at least one deformation limiting element, which is formed in the manner according to the invention, i.e. has at least one reinforcement region, which is formed by bending a region of the deformation limiting sheet out of the plane of the deformation limiting sheet.

The additional bead protected by the additional deformation limiting means can surround in particular a fastening element opening as additional opening.

Besides the deformation limiting means for protecting the combustion chamber opening and possibly additional deformation limiting means for additional beads, the cylinder head gasket can also comprise an edge deformation limiting means for protecting a boundary bead, with which at least one gasket sheet of the cylinder head gasket is provided along its outer edge.

This edge deformation limiting means is preferably also disposed on the deformation limiting sheet.

It is particularly favourable if the edge deformation limiting means has at least one deformation limiting element, which is configured in the manner according to the invention, i.e. has at least one reinforcement region, which is formed by bending an edge region of the deformation limiting sheet out of the plane of the deformation limiting sheet.

Further features and advantages of the invention are the subject of the following description and the drawing representing the embodiments:

FIG. 9 shows a schematic section through a second embodiment of a cylinder head gasket along lines A—A in FIGS. 1 and 2;

FIG. 10 shows a schematic section through the second embodiment of a cylinder head gasket along lines B—B in FIGS. 1 and 2;

FIG. 11 shows a schematic section through the second embodiment of a cylinder head gasket along lines C—C in FIGS. 1 and 2;

FIG. 12 shows a schematic section through the second embodiment of a cylinder head gasket along lines D—D in FIGS. 1 and 2;

FIG. 16 shows a schematic section through a fifth embodiment of a cylinder head gasket along line A'—A' in FIG. 15;

FIG. 17 shows a schematic section through a sixth embodiment of a cylinder head gasket along line A'—A' in FIG. 15;

FIG. 18 shows a schematic section through a seventh embodiment of a cylinder head gasket along line A'—A' in FIG. 15;

FIG. 19 shows a schematic section through an eighth embodiment of a cylinder head gasket along line A'—A' in FIG. 15.

Like or functionally equivalent elements are given the same reference numerals in all the figures.

Figure 1:
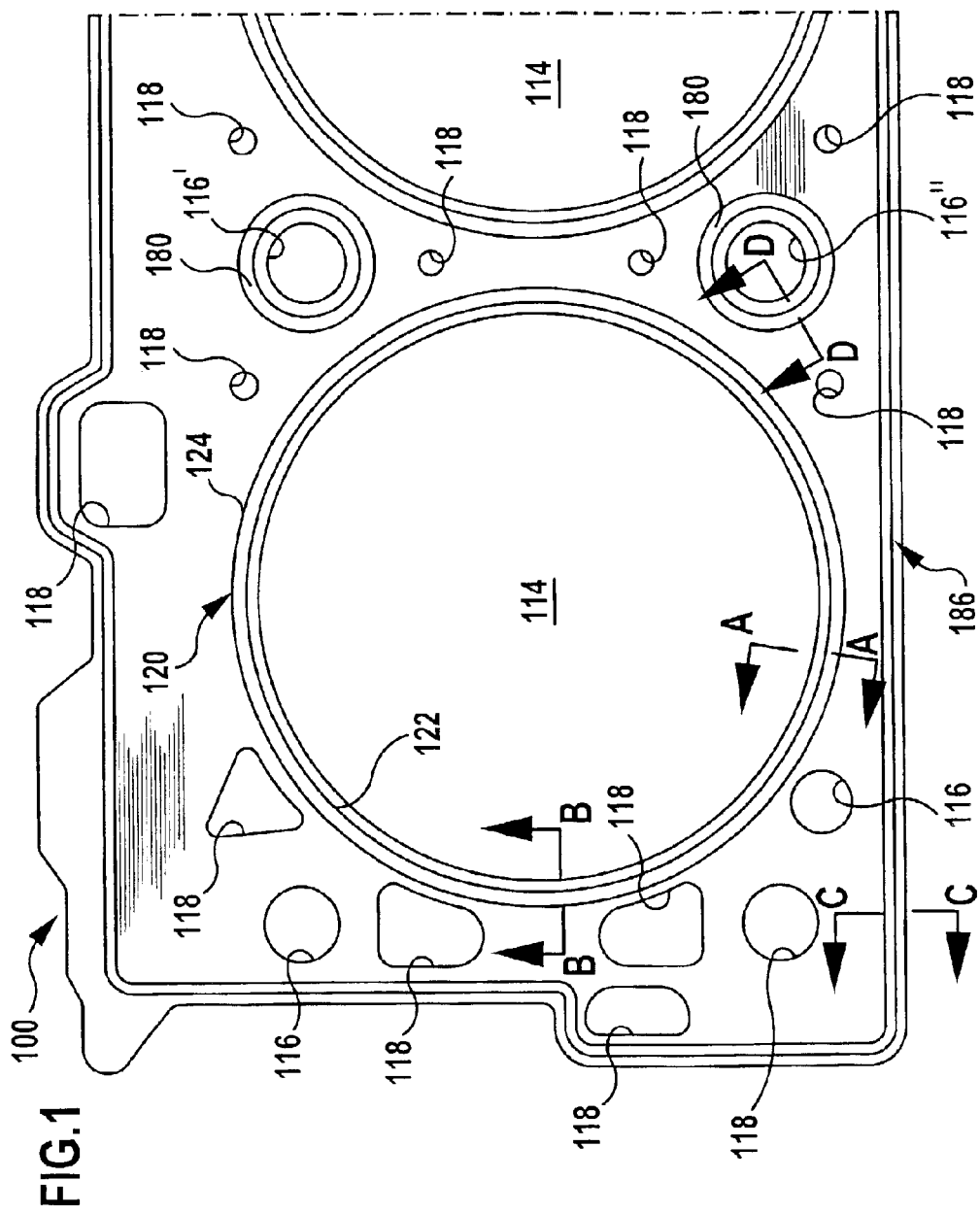
FIG. 1 is a top view, in sections, onto a beaded cover layer of a cylinder head gasket.

A cylinder head gasket shown in FIGS. 1 to 8 and given the overall reference 100 (see FIG. 3) comprises an essentially plane upper cover sheet 102, an essentially plane lower cover sheet 104 and an essentially plane deformation limiting sheet 106 disposed between the upper cover sheet 102 and the lower cover sheet 104.

The upper cover sheet 102 and the lower cover sheet 104 are formed from a spring elastic material, e.g. a spring steel sheet.

The deformation limiting sheet 106 is formed from a metallic material, which is preferably more easily deformed than the material of the cover sheets 102 and 104. The material of the deformation limiting sheet 106 preferably has a tensile strength of less than 1 000 N/mm$^2$.

Figure 3:
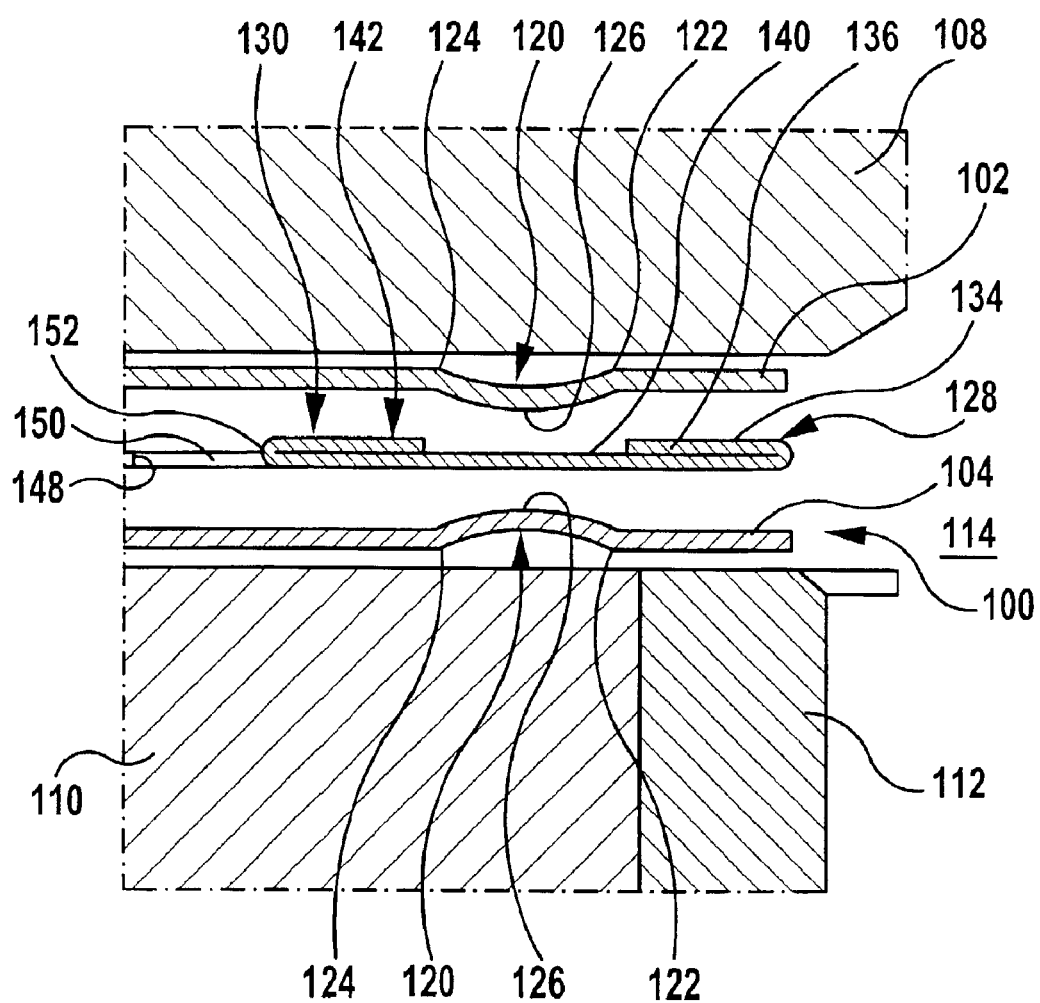
FIG. 3 shows a schematic section through the cylinder head gasket from FIGS. 1 and 2 as well as through an adjoining cylinder head and an adjoining engine block along lines A—A in FIGS. 1 and 2.

As shown in FIG. 3, the cylinder head gasket 100 is provided for arrangement between a cylinder head 108 on one side and an engine block 110 with cylinder liners 112 accommodated therein on the other.

Figure 2:
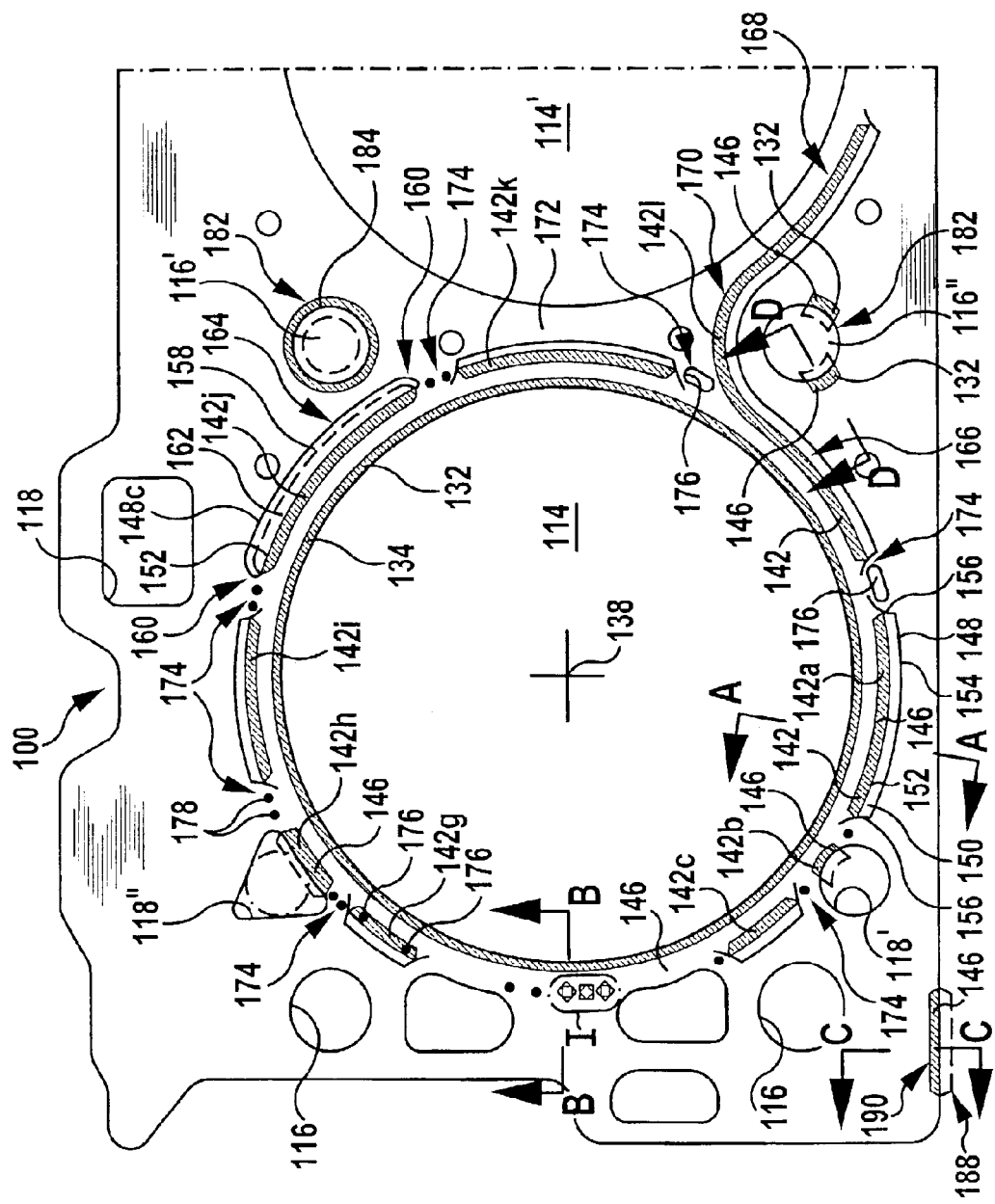
FIG. 2 is a top view, in sections, onto a deformation limiting sheet of a cylinder head gasket.

Each of the sheets of the cylinder head gasket 100 is provided with circular combustion chamber openings 114 associated with the combustion chambers of the engine block 110 (see FIGS. 1 and 2).

In addition, all the sheets of the cylinder head gasket 100 are provided with fastening element openings 116 for the passage of fastening elements, e.g. cylinder head screws, through the cylinder head gasket 100 and with fluid openings 118, which allow the passage of fluids, e.g. coolants or lubricants, through the cylinder head gasket 100, in which case the combustion chamber openings 114, fastening element openings 116 and fluid openings 118 provided in the different sheets of the cylinder head gasket 100 are all essentially flush with one another.

To assure a sufficiently gastight seal of the combustion chambers, the upper cover sheet 102 and the lower cover sheet 104 are respectively provided with combustion chamber beads 120, which respectively surround one of the combustion chamber openings 114.

As may be seen from FIG. 3, these beads 120 are configured as full beads, which are bordered towards the combustion chamber opening 114 by an inner bead edge 122 and on the side remote from the combustion chamber opening by an outer bead edge 124, and arch between the inner and the outer bead edge 122 and 124 respectively towards the deformation limiting sheet 106, in which case the dome 126 of the arched region defines the sealing line of the respective bead 120.

To prevent damage to the combustion chamber beads 120 as a result of the sealing gap variations occurring during operation of the internal combustion engine, the cylinder head gasket 100 comprises an inner deformation limiting means 128 and an outer deformation limiting means 130, which in the shown embodiment are both provided on the deformation limiting sheet 106.

The inner deformation limiting means 128 is disposed between the combustion chamber beads 120 and the associated combustion chamber opening 114, whereas the outer deformation limiting means 130 is disposed in the region of the deformation limiting sheet 106 located outside the combustion chamber beads 120 and remote from the combustion chamber opening 114.

As deformation limiting element 132, the inner deformation limiting means 128 comprises a folded flange 134 that extends around the combustion chamber opening 114 in a ring shape and is formed by the edge region 136 of the deformation limiting sheet 106 bordering the combustion chamber opening 116 being bent out of the plane of the deformation limiting sheet and folded over radially outwards—viewed from the central point 138 of the combustion chamber opening 114—onto the upper side 140 of the deformation limiting sheet.

The outer deformation limiting means 130 comprises a plurality of deformation limiting elements 142, which are arranged consecutively in the peripheral direction of the combustion chamber opening 114 and are spaced from one another in the peripheral direction, and between which a web 174 is respectively disposed in the deformation limiting sheet 106.

The deformation limiting element, given the reference 142a (see FIG. 2), of the outer deformation limiting means 130 is formed by a reinforcement region 146, which extends in the peripheral direction of the combustion chamber opening 114, being separated out of the deformation limiting sheet 106 along a separating line 148 and then being bent upwards out of the plane of the deformation limiting sheet 106 and folded over radially inwards—viewed from the central point 138 of the combustion chamber opening 114—onto the upper side 140 of the deformation limiting sheet 106.

Because of this method of production of the deformation limiting element 142a, an opening 150 remains in the deformation limiting sheet 106 beside the reinforcement region 146, and this opening is bordered on its radially outer side and at its ends by the separating line 148 and on its radially inner side by the bending line 152, along which the reinforcement region has been bent out of the plane of the deformation limiting sheet 106.

The separating line 148 comprises a middle section 154, which extends in the peripheral direction of the combustion chamber opening 114, and two end sections 156, which extend transversely to the peripheral direction and transversely to the radius of the combustion chamber opening 114, so that the opening 150 widens towards the combustion chamber opening 114.

To prevent the deformation limiting sheet 106 from tearing at the end regions of the openings 150 during operation of the cylinder head gasket 100, the end sections 156 of the separating line 148 continue into the region of the deformation limiting sheet 106 that is not bent out of the plane of the deformation limiting sheet 106 and, as may be seen from FIG. 2, terminate at a distance from the opening 150 and from the reinforcement region 146 of the deformation limiting element 142a and at a distance from the combustion chamber opening 114, which corresponds essentially to the distance of the radially inner edge of the reinforcement region 146 from the combustion chamber opening 114.

The portion of the end sections 156 of the separating line 148 continued into the region of the deformation limiting sheet 106 that is not bent out is curved in a convex shape—viewed from the central point 138 of the combustion chamber opening 114.

The deformation limiting element 142b following deformation limiting element 142a in the peripheral direction of the combustion chamber opening direction 114 (clockwise in the view in FIG. 2) has a reinforcement region 146 which is disposed on the edge of a fluid opening 118'.

This reinforcement region 146 is formed by a region of the deformation limiting sheet 106 projecting into the fluid opening 118' being left when the fluid opening 118' is punched out and this region then being bent upwards out of the plane of the deformation limiting sheet 106 along the edge of the fluid opening 118' and folded over radially inwards—viewed from the central point 138 of the combustion chamber opening 114—onto the upper side 140 of the deformation limiting sheet 106.

As may be seen from FIG. 2, the reinforcement region 146 of the deformation limiting element 142b extends in the peripheral direction of the fluid opening 118'.

A deformation limiting element 142c, which corresponds in structure to deformation limiting element 142a but extends over a smaller angle of circumference, follows deformation limiting element 142b in the peripheral direction of the combustion chamber opening 114.

Figure 4:
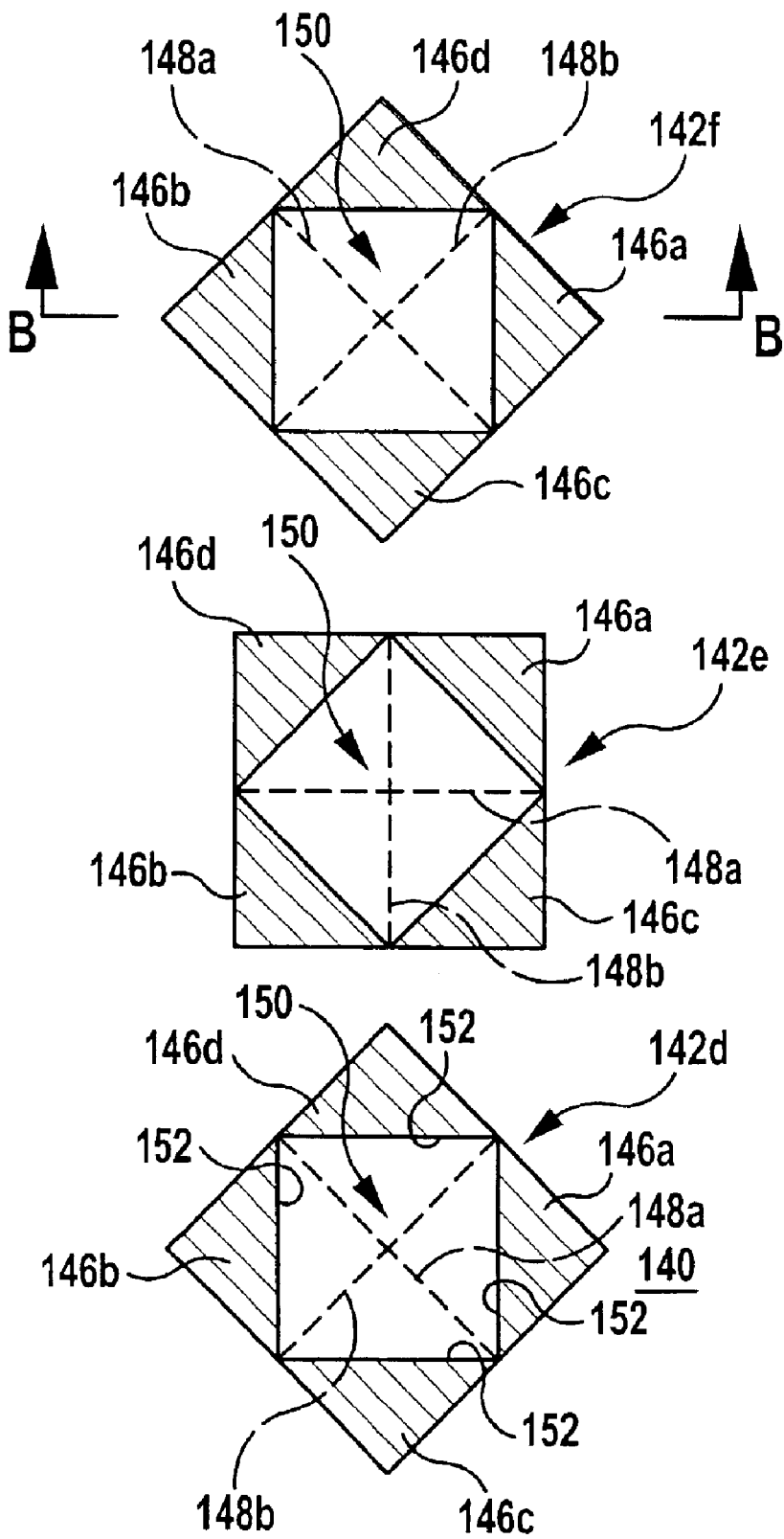
FIG. 4 is an enlarged representation of the area I from FIG. 2.
Figure 5:
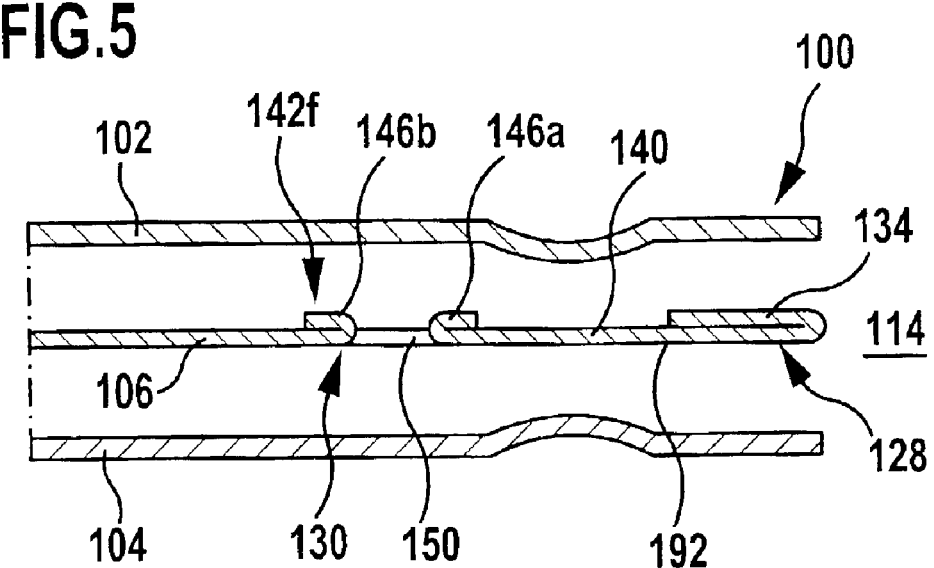
FIG. 5 shows a schematic section through the cylinder head gasket along lines B—B in FIGS. 1 and 2.
Figure 6:
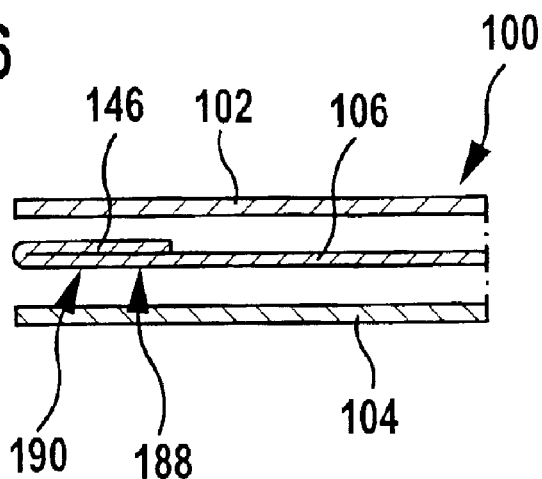
FIG. 6 shows a schematic section through the cylinder head gasket along lines C—C in FIGS. 1 and 2.
Figure 7:
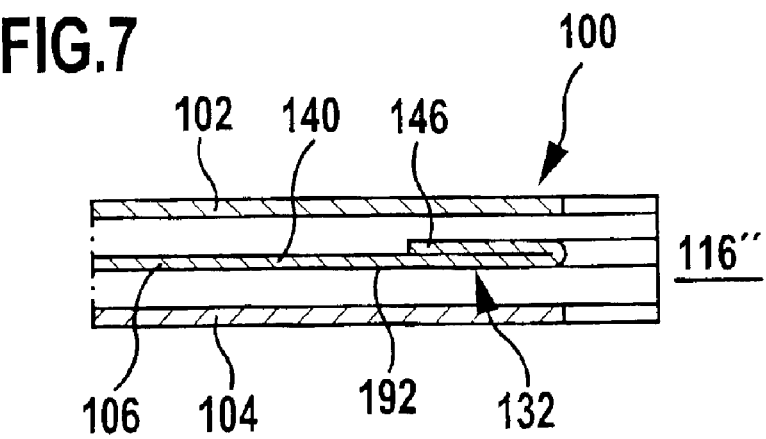
FIG. 7 shows a schematic section through the cylinder head gasket along lines D—D in FIGS. 1 and 2.

A group of three deformation limiting elements 142d, 142e and 142f, which are shown in particular in the enlarged top view in FIG. 4, follow the deformation limiting element 142c in the peripheral direction of the combustion chamber opening 114.

The deformation limiting element 142d has four reinforcement regions 146a, 146b, 146c and 146d, which are formed by the deformation limiting sheet 106 being cut into along two intersecting separating lines 148a, 148b, which form the diagonals of a four-sided shape, in particular a square, and the triangular regions thus separated from the deformation limiting sheet 106 being bent upwards out of the plane of the deformation limiting sheet 106 via bending lines 152 connecting the end points of the separating lines 148a, b to one another and folded over onto the upper side 140 of the deformation limiting sheet 106.

In this case,—viewed from the central point of the combustion chamber opening 114—reinforcement region 146a is folded over radially inwards, reinforcement region 146b is folded over radially outwards and reinforcement regions 146c, 146d are folded over in mutually opposed peripheral directions of the combustion chamber opening 114.

An essentially square opening 150 remains between reinforcement regions 146a to 146d.

Alternatively, a deformation limiting element could also be provided which has three or more than four reinforcement regions disposed around a polygonal opening with a corresponding number of sides.

The deformation limiting element 142e following deformation limiting element 142d in the peripheral direction of the combustion chamber opening 114 corresponds in structure to deformation limiting element 142d, but is rotated around a rotational axis directed perpendicular to the plane of deformation limiting sheet 106 around an angle of approximately 45° so that the separating line 148a is oriented radially to the combustion chamber opening 114, whereas in the case of deformation limiting element 142d the angle bisecting line of the two separating lines 148a and 148b is oriented radially to the combustion chamber opening 114.

The deformation limiting element 142f following deformation limiting element 142e in the peripheral direction of the combustion chamber opening 114 corresponds in structure and orientation to deformation limiting element 142d; in particular, in the case of deformation limiting element 142f the angle bisecting line of the two separating lines 148a and 148b is oriented radially to the combustion chamber opening 114.

A deformation limiting element 142g, which corresponds in structure to deformation limiting element 142a but extends over a smaller angle of circumference, follows deformation limiting element 142f in the peripheral direction of the combustion chamber opening 114.

A deformation limiting element 142h, the reinforcement region 146 of which is disposed on the edge of a fluid opening 118", follows deformation limiting element 142g in the peripheral direction of the combustion chamber opening 114.

The reinforcement region 146 of deformation limiting element 142h is formed by a region of the deformation limiting sheet 106 projecting into the fluid opening 118" being left when the fluid opening 118" is punched out and this region then being bent upwards out of the plane of the deformation limiting sheet 106 along the edge of the fluid opening 118" and folded over radially inwards—viewed from the central point 138 of the combustion chamber opening 114—onto the upper side 140 of the deformation limiting sheet 106.

A deformation limiting element 142i, which corresponds in structure to deformation limiting element 142a but extends over a smaller angle of circumference, follows deformation limiting element 142h in the peripheral direction of the combustion chamber opening 114.

A deformation limiting element 142j follows deformation limiting element 142i in the peripheral direction of the combustion chamber opening 114, this deformation limiting element 142j being formed by a narrow opening 158, which extends in the peripheral direction of the combustion chamber opening 114, being punched out of the deformation limiting sheet 106 along a separating line 148c closed in a ring shape, the end regions 160 of said narrow opening extending towards the combustion chamber opening 114. The thus punched out region of the deformation limiting sheet 106 located between the end regions 160 of the opening 158 is then bent out of the plane of the deformation limiting sheet 106 along a bending line 152, which connects the ends of the opening 158 to one another, and folded over radially inwards—viewed from the central point 138 of the combustion chamber opening 114—onto the upper side 140 of the deformation limiting sheet 106 to thus form a reinforcement region 146 of deformation limiting element 142j.

The opening 162 formed by the reinforcement region 146 being bent out of the plane of the deformation limiting sheet 106, together with the opening 158 punched out along the separating line 148c closed in a ring shape, forms an opening 164 adjoining the reinforcement region 146 of the deformation limiting element 142j.

A deformation limiting element 142k, which corresponds in structure to deformation limiting element 142a and extends over approximately the same angle of circumference, follows deformation limiting element 142j in the peripheral direction of the combustion chamber opening 114.

A deformation limiting element 142l follows deformation limiting element 142k in the peripheral direction of the combustion chamber opening 114. Said deformation limiting element 142l is formed in a corresponding manner to deformation limiting element 142a, however does not extend solely in the peripheral direction of the combustion chamber opening 114, but besides a section 166 extending in the peripheral direction of the combustion chamber opening 114, comprises a section 168 extending in the peripheral direction of the adjacent combustion chamber opening 114' as well as a middle section 170 curved in a convex shape—viewed from the central points 138 of the combustion chamber openings 114, 114'—connecting the two sections 166 and 168 to one another.

This deformation limiting element 142l serves to limit the deformation of the combustion chamber beads 120 surrounding the combustion chamber openings 114, 114' in the end region of the web 172 separating the two combustion chamber openings 114, 114' from one another.

The structure, arrangement and sequence of the deformation limiting elements 142 of the outer deformation limiting means 130 need not necessarily correspond to that described above.

Hence, it would be possible in particular to compose the outer deformation limiting means 130 solely from deformation limiting elements, which correspond in structure to deformation limiting element 142a, i.e. have a single reinforcement region 146, which has been separated out of the deformation limiting sheet 106 along a separating line 148 and bent upwards out of the plane of the deformation limiting sheet 106 along a bending line 152 and folded over radially inwards—viewed from the central point 138 of the combustion chamber opening 114—onto the upper side 140 of the deformation limiting sheet 106.

Figure 8:
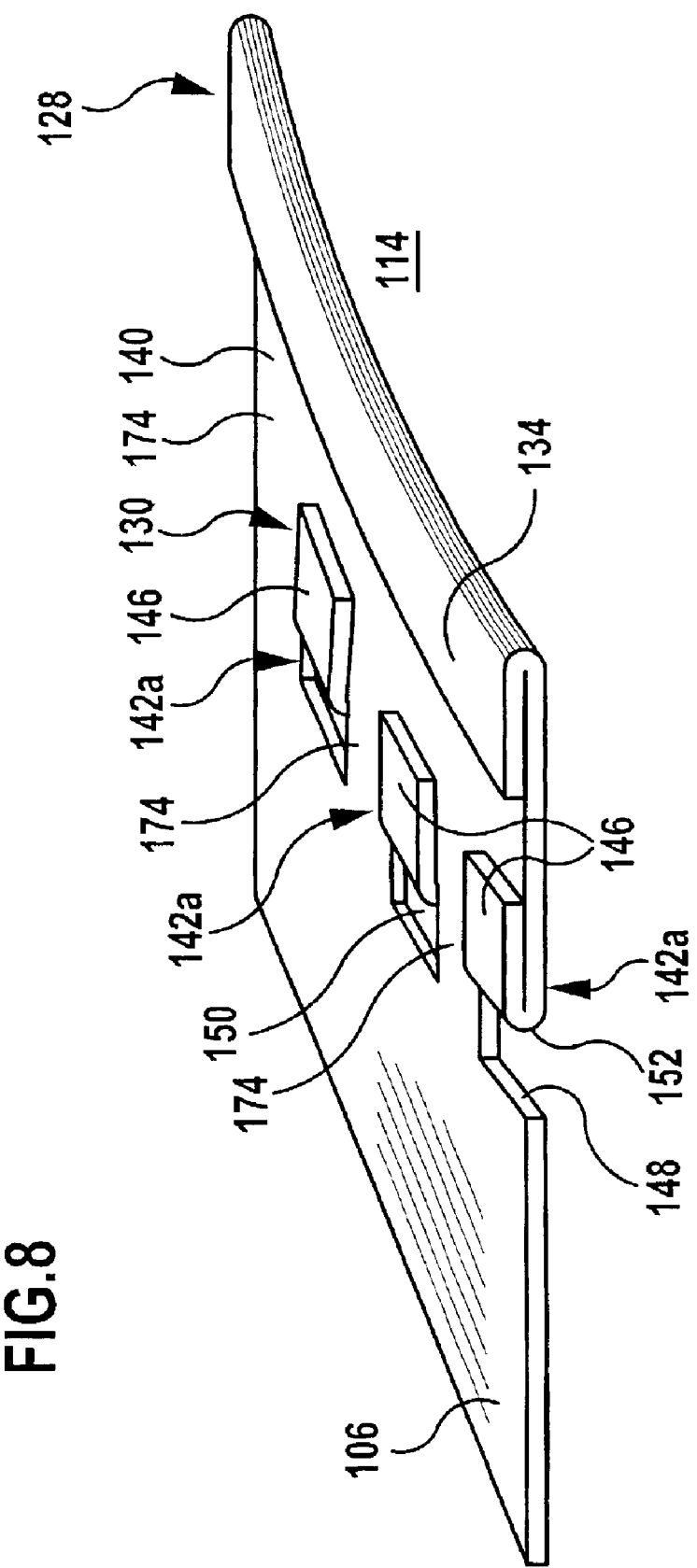
FIG. 8 is a schematic perspective representation of an inner and an outer deformation limiting means.

An outer deformation limiting means 130 composed from such deformation limiting elements 142a arranged consecutively in the peripheral direction of the combustion chamber opening 114 is shown schematically in FIG. 8.

The angle of circumference α relative to the central point 138 of the combustion chamber opening 114 via which the reinforcement region 146 of such a deformation limiting element 142a extends, and/or the angle of circumference β via which the respective web 174 extending between two consecutive deformation limiting elements 142a extends, can be constant over the periphery of the combustion chamber opening 114 or vary as a function of the geometry of the components adjoining the cylinder head gasket and the openings provided in the cylinder head gasket 100.

To prevent the reinforcement regions 146 of the deformation limiting elements 142 from lifting from the deformation limiting sheet 106 during operation of the cylinder head gasket 100, it can be provided that the reinforcement regions 146 are fixed to the deformation limiting sheet 106, e.g. by gluing or welding.

In particular, the reinforcement region 146 of a deformation limiting element 142 can be connected by weld points 176 to the region of the deformation limiting sheet 106, against which the reinforcement region 146 abuts, as is shown in FIG. 2 by the example of deformation limiting element 142g.

By fixing the reinforcement region 146 of a deformation limiting element 142 to the region of the deformation limiting sheet 106, against which the reinforcement region 146 abuts, the reinforcement region 146 is prevented from shearing off relative to the adjoining web regions 174.

In order to reduce shearing movements in the web region 174 located between the deformation limiting elements 142 of the outer deformation limiting means 130, it is additionally advantageous to disconnect the region of the deformation limiting sheet 106 located radially outside the outer deformation limiting means 130 from the region of the deformation limiting sheet 106 located radially inside the outer deformation limiting means 130.

This disconnection can be achieved by incorporating additional beads 176 into the deformation limiting sheet 106 in the web regions 174, which extend through the respective web region 174 in the peripheral direction of the combustion chamber opening 114, as is shown in FIG. 2 for the web regions 174 between deformation limiting element 142a and deformation limiting element 142l and also for the web region 174 between deformation limiting element 142l and deformation limiting element 142k.

Alternatively or in addition to this, to disconnect the radially outer region of the deformation limiting sheet 106 from its radially inner region, it can also be provided that the deformation limiting sheet 106 is welded in one or more web regions 174 to another gasket sheet of the cylinder head gasket 100, i.e. to the upper cover sheet 102 and/or to the lower cover sheet 104.

In this case, the welding can be performed at weld points 178, as shown in FIG. 2, or along weld seams extending in the peripheral direction of the combustion chamber opening 114.

As may be seen from the top view onto the cylinder head gasket 100 in FIG. 1, the cover sheets 102, 104 of the cylinder head gasket 100 have additional beads 180 besides the combustion chamber beads 120, said additional beads surrounding the fastening element opening 116' or fastening element opening 116" in a ring shape.

In order to also protect these additional beads 180, an additional deformation limiting means 182 is provided for each of the beads 180 on the deformation limiting sheet 106. The deformation limiting means 182 for the additional beads 180 around the fastening element opening 116' comprises a folded flange 184 as deformation limiting element, which is formed by the edge region of the deformation limiting sheet 106 that projects into the fastening element opening 116' being bent upwards out of the plane of the deformation limiting sheet 106 along the edge of the fastening element opening 116' after the fastening element opening 116' has been punched out and folded over radially outwards—viewed from the central point of the fastening element opening 116'—onto the upper side 140 of the deformation limiting sheet 106.

The deformation limiting means 182 for the additional bead 180 surrounding the fastening element opening 116" comprises several, e.g. two, deformation limiting elements 132, which are spaced from one another in the peripheral direction of the fastening element opening 116 and which respectively have a reinforcement region 146, which is formed by a region of the deformation limiting sheet 106 projecting into the fastening element opening 116" being left when the fastening element opening 116" is punched out and this projecting region then being bent upwards out of the plane of the deformation limiting sheet 106 along the edge of the fastening element opening 116" and folded over radially outwards—viewed from the central point 138 of the fastening element opening 116"—onto the upper side 140 of the deformation limiting sheet 106.

As is additionally evident from the top view onto the cylinder head gasket 100 in FIG. 1, the cover sheets 102, 104 of the cylinder head gasket 100 are provided with a circumferential boundary bead 186 running along the outer edge of the cover sheets 102, 104.

In order to limit the deformation of this boundary bead 186, an edge deformation limiting means 188 is provided on the deformation limiting sheet 106 which comprises deformation limiting elements 190 disposed on the outer edge of the deformation limiting sheet 106, of which only one is shown as example in FIG. 2.

The deformation limiting element 190 comprises a reinforcement region 146, which is formed by a region of the deformation limiting sheet 106 projecting over the outer edge of the deformation limiting sheet 106 being left when the fluid opening 118' is punched out and this region then being bent upwards out of the plane of the deformation limiting sheet 106 along the outer edge of the deformation limiting sheet 106 and folded inwards onto the upper side 140 of the deformation limiting sheet 106.

The reinforcement regions 146 of all the above-described deformation limiting means 128, 130, 182 and 188 can be of variable construction with respect to their height and/or width in the longitudinal direction of the respectively associated bead in order to achieve uniformity of the distribution of surface pressure along the respective bead—i.e. taking into consideration the rigidity values of the components adjoining the cylinder head gaskets 100 and also taking into consideration the differences in the local heat expansion of these components during operation of the cylinder head gasket.

In the first embodiment of a cylinder head gasket 100 shown in FIGS. 1 to 8, the reinforcement regions 146 of the deformation limiting elements are all bent upwards, i.e. towards the cylinder head side of the deformation limiting sheet 106, out of the plane of the deformation limiting sheet and folded over onto the upper side 140 of the deformation limiting sheet 106 on the cylinder head side.

A second embodiment of a cylinder head gasket 100 shown in FIGS. 9 to 12 differs from the above-described first embodiment solely in that the reinforcement regions 146 of the deformation limiting elements are bent downwards, i.e. towards the engine block side of the deformation limiting sheet, out of the plane of the deformation limiting sheet 106 and folded over onto the underside 192 of the deformation limiting sheet 106 on the engine block side.

Otherwise, the second embodiment of a cylinder head gasket 100 has the same structure and function as the first embodiment and reference should be made to the above description of this in this regard.

Figure 13:
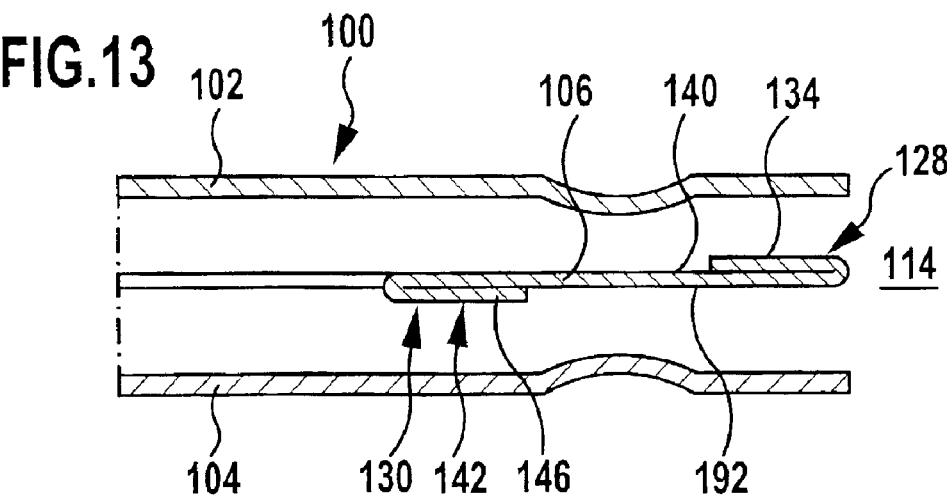
FIG. 13 shows a schematic section through a third embodiment of a cylinder head gasket along lines A—A in FIGS. 1 and 2.

A third embodiment of a cylinder head gasket 100 shown in FIG. 13 differs from the above-described first embodiment solely in that the reinforcement regions 146 of the deformation limiting elements 142 of the outer deformation limiting means 130 are bent out of the plane of the deformation limiting sheet 106 towards the engine block side of the deformation limiting sheet 106 and folded over onto the underside 192 of the deformation limiting sheet 106 on the engine block side, whereas the folded flange 134 of the inner deformation limiting means 128, as in the case of the first embodiment, is bent out of the plane of the deformation limiting sheet 106 towards the cylinder head side of the deformation limiting sheet 106 and folded over onto the upper side 140 of the deformation limiting sheet 106 on the cylinder head side.

Otherwise, the third embodiment of a cylinder head gasket has the same structure and function as the first embodiment and reference should be made to the above description of this in this regard.

Figure 14:
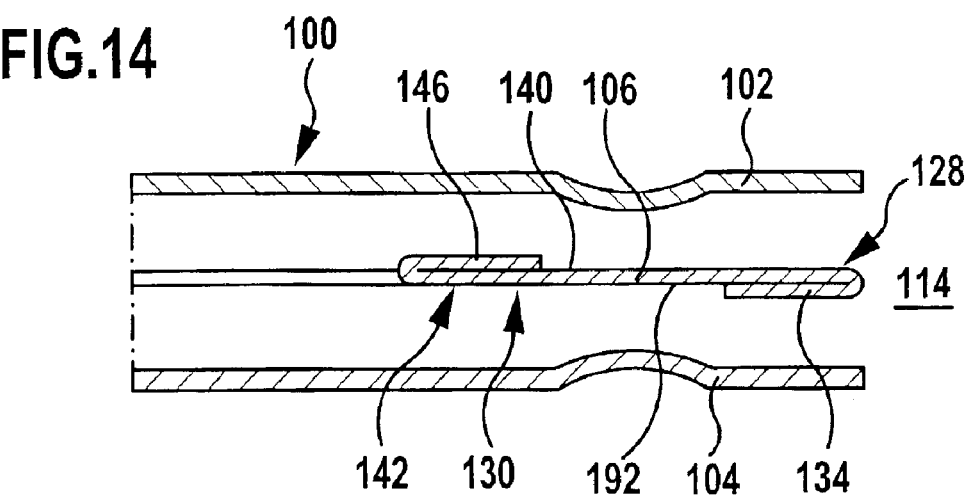
FIG. 14 shows a schematic section through a fourth embodiment of a cylinder head gasket along lines A—A in FIGS. 1 and 2.

A fourth embodiment of a cylinder head gasket 100 shown in FIG. 14 differs from the above-described first embodiment solely in that the folded flange 134 of the inner deformation limiting means 128 is bent downwards, i.e. towards the engine block side of the deformation limiting sheet 106, out of the plane of the deformation limiting sheet 106 and folded over onto the underside 192 of the deformation limiting sheet 106 on the engine block side, whereas, as in the case of the first embodiment, the reinforcement regions 146 of the deformation limiting elements 142 of the outer deformation limiting means 130 are bent out of the plane of the deformation limiting sheet 106 towards the cylinder head side of the deformation limiting sheet 106 and folded over onto the upper side 140 of the deformation limiting sheet 106 on the cylinder head side.

Otherwise, the fourth embodiment of a cylinder head gasket 100 has the same structure and function as the first embodiment and reference should be made to the above description of this in this regard.

Figure 15:
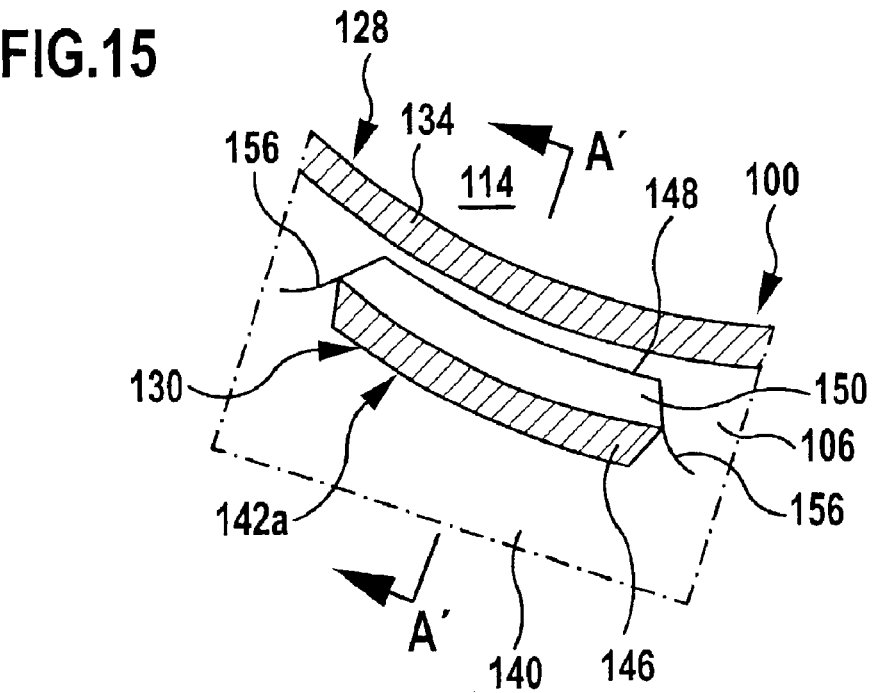
FIG. 15 is a top view, in sections, onto a deformation limiting sheet of a fourth embodiment of the cylinder head gasket.

A fifth embodiment of a cylinder head gasket 100 shown in FIGS. 15 and 16 differs from the above-described first embodiment in that the reinforcement regions 146 of the deformation limiting elements 142a, 142c, 142g, 142i, 142j, 142k and 142l are not folded over radially inwards—viewed from the central point 138 of the combustion chamber opening 114—but radially outwards onto the upper side 140 of the deformation limiting sheet 106.

Hence, in the case of this fifth embodiment, the openings 150 formed by the reinforcement regions 146 being bent out of the plane of the deformation limiting sheet 106 are disposed in the deformation limiting sheet 106 on the side of the reinforcement regions 146 facing the combustion chamber opening 114.

Moreover, the end sections 156 of the respective separating lines 148, which continue into the region of the deformation limiting sheet 106 that is bent out of the plane of the deformation limiting sheet 106, are curved in a concave shape—viewed from the central point 138 of the combustion chamber opening 114.

Otherwise, the fifth embodiment of a cylinder head gasket 100 has the same structure and function as the first embodiment and reference should be made to the above description of this in this regard.

A sixth embodiment of a cylinder head gasket 100 shown in FIG. 17 differs from the above-described fifth embodiment solely in that the reinforcement regions 146 of the deformation limiting elements 142a, 142c, 142g, 142i, 142j, 142k and 142l are not bent out of the plane of the deformation limiting sheet 106 towards the cylinder head side of the deformation limiting sheet 106, but towards its engine block side and are folded over radially outwards—viewed from the central point 138 of the combustion chamber opening 114—onto the underside 192 of the deformation limiting sheet 106.

Moreover, in the case of this embodiment, the folded flange 134 of the inner deformation limiting means 128 is also bent out of the plane of the deformation limiting sheet 106 towards the engine block side and folded over onto the underside 192 of the deformation limiting sheet 106 on the engine block side.

Otherwise, the sixth embodiment of a cylinder head gasket 100 has the same structure and function as the fifth embodiment and reference should be made to the above description of this in this regard.

A seventh embodiment of a cylinder head gasket 100 shown in FIG. 18 differs from the above-described fifth embodiment solely in that the reinforcement regions 146 of the deformation limiting elements 142 of the outer deformation limiting means 130 are bent out of the plane of the deformation limiting sheet 106 towards the engine block side and are folded over onto the underside 192 of the deformation limiting sheet 106 on the engine block side, whereas, as in the case of the fifth embodiment, the folded flange 134 of the inner deformation limiting means 128 is bent out of the plane of the deformation limiting sheet 106 towards the cylinder head side and folded over onto the upper side 140 of the deformation limiting sheet 106.

Otherwise, the seventh embodiment of a cylinder head gasket 100 has the same structure and function as the fifth embodiment and reference should be made to the above description of this in this regard.

An eighth embodiment of a cylinder head gasket 100 shown in FIG. 19 differs from the above-described fifth embodiment solely in that the folded flange 134 of the inner deformation limiting means 128 is bent out of the plane of the deformation limiting sheet 106 towards the engine block side and folded over onto the underside 192 of the deformation limiting sheet 106 on the engine block side, whereas, as in the case of the fifth embodiment, the reinforcement regions 146 of the deformation limiting elements 142 of the outer deformation limiting means 130 are bent out of the plane of the deformation limiting sheet 106 towards the cylinder head side and folded over radially outwards onto the upper side 140 of the deformation limiting sheet 106.

Otherwise, the eighth embodiment of a cylinder head gasket 100 has the same structure and function as the fifth embodiment and reference should be made to the above description of this in this regard.

Figure 20:
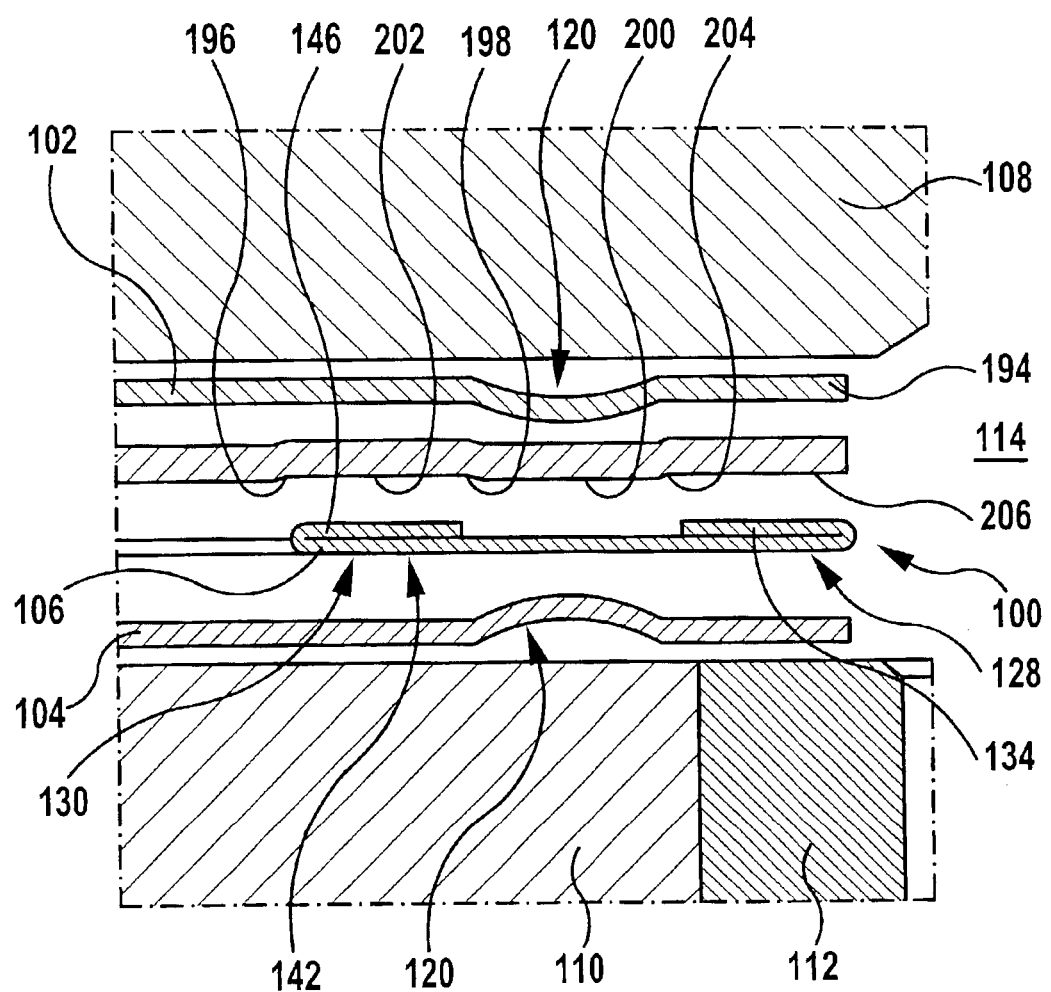
FIG. 20 shows a schematic section through a ninth embodiment of a cylinder head gasket with an additional support plate as well as through an adjoining cylinder head and an adjoining engine block along lines A—A in FIGS. 1 and 2.

A ninth embodiment of a cylinder head gasket 100 shown in FIG. 20 differs from the above-described first embodiment solely in that an additional, essentially plane spacer sheet 194 is disposed between the upper cover sheet 102 and the deformation limiting sheet 106 of the cylinder head gasket 100.

This spacer sheet 194 has an outer stepped section 196 located radially outside the reinforcement regions 146 of the outer deformation limiting means 130 on the deformation limiting sheet 106 and a middle stepped section 198 located radially inside the reinforcement regions 146 of the deformation limiting elements 142 of the outer deformation limiting means 130, so that a displaced region 202 is formed between the outer stepped section 196 and the middle stepped section 198 on the underside 200 of the spacer sheet 194 facing the deformation limiting sheet 106.

Moreover, the spacer sheet 104 has an inner stepped section 204 located radially outside the folded flange 134 of the inner deformation limiting means 128 on the deformation limiting sheet 106, through which inner stepped section a displaced region 206 disposed between the inner stepped section 204 and the inner edge of the spacer sheet 194 is formed on the underside 200 of the spacer sheet 194.

Otherwise, the ninth embodiment of a cylinder head gasket 100 has the same structure and function as the first embodiment and reference should be made to the above description of this in this regard.

What is claimed is:

1. Cylinder head gasket, comprising
   at least one beaded gasket sheet, which comprises a single or multiple combustion chamber openings and a bead, which may be vertically deformed and surrounds at least one of said combustion chamber openings, and
   at least one deformation limiting means adjacent to the bead, wherein the deformation limiting means comprises at least one deformation limiting element disposed on a deformation limiting sheet of the cylinder head gasket, said deformation limiting element having at least one reinforcement region, which is spaced from said single or each of said multiple combustion chamber openings and which comprises a partially separated and bent region of the deformation limiting sheet connected to the deformation limiting sheet as a part thereof, the deformation limiting sheet having an opening beside the partially separated and bent region.

2. Cylinder head gasket according to claim 1, wherein the reinforcement region of the at least one deformation limiting element is oriented substantially parallel to the plane of the deformation limiting sheet.

3. Cylinder head gasket according to claim 1, wherein the reinforcement region of the at least one deformation limiting element abuts against one of the major surfaces of the deformation limiting sheet.

4. Cylinder head gasket according to claim 1, wherein the reinforcement region of the at least one deformation limiting element is bent out of the plane of the deformation limiting sheet towards the cylinder head side of the deformation limiting sheet.

5. Cylinder head gasket according to claim 1, wherein the reinforcement region of the at least one deformation limiting element is bent out of the plane of the deformation limiting sheet towards the engine block side of the deformation limiting sheet.

6. Cylinder head gasket according to claim 1, wherein the deformation limiting sheet is identical to the beaded gasket sheet.

7. Cylinder head gasket according to claim 1, wherein the deformation limiting sheet is a different gasket sheet of the cylinder head gasket from the beaded gasket sheet.

8. Cylinder head gasket according to claim 7, wherein a further gasket sheet of the cylinder head gasket is disposed between the deformation limiting sheet and the beaded gasket sheet.

9. Cylinder head gasket according to claim 8, wherein the reinforcement region of the at least one deformation limiting element is bent out of the plane of the deformation limiting sheet towards the side of the deformation limiting sheet facing the further gasket sheet of the cylinder head gasket.

10. Cylinder head gasket according to claim 1, wherein the at least one deformation limiting element is disposed on the side of the bead remote from the combustion chamber opening.

11. Cylinder head gasket according to claim 1, wherein the deformation limiting means comprises a plurality of deformation limiting elements, which are arranged consecutively in the peripheral direction of the combustion chamber opening.

12. Cylinder head gasket according to claim 11, wherein in a region between two deformation limiting elements arranged consecutively in the peripheral direction of the combustion chamber opening, the deformation limiting sheet is connected to another gasket sheet of the cylinder head gasket.

13. Cylinder head gasket according to claim 11, wherein the deformation limiting sheet is provided with a stamping in a region between two deformation limiting elements arranged consecutively in the peripheral direction of the combustion chamber opening.

14. Cylinder head gasket according to claim 1, wherein the cylinder head gasket comprises an outer deformation limiting means and an inner deformation limiting means.

15. Cylinder head gasket according to claim 14, wherein the outer deformation limiting means and the inner deformation limiting means are disposed on the deformation limiting sheet.

16. Cylinder head gasket according to claim 15, wherein the deformation limiting elements of the outer deformation limiting means and the inner deformation limiting means project above the respectively adjoining regions of the deformation limiting sheet towards the same side of the deformation limiting sheet.

17. Cylinder head gasket according to claim 15, wherein the deformation limiting elements of the outer deformation limiting means and the inner deformation limiting means project above the respectively adjoining regions of the deformation limiting sheet towards different sides of the deformation limiting sheet.

18. Cylinder head gasket according to claim 14, wherein the inner deformation limiting means comprises a deformation limiting element, which has a reinforcement region, which adjoins the combustion chamber opening of the deformation limiting sheet and is formed by bending the edge region of the combustion chamber opening out of the plane of the deformation limiting sheet.

19. Cylinder head gasket according to claim 1, wherein at least one of the reinforcement regions is bent out of the plane of the deformation limiting sheet towards the combustion chamber opening of the deformation limiting sheet.

20. Cylinder head gasket according to claim 1, wherein at least one of the reinforcement regions is bent out of the plane of the deformation limiting sheet away from the combustion chamber opening of the deformation limiting sheet.

21. Cylinder head gasket according to claim 19, wherein the deformation limiting means comprises a plurality of deformation limiting elements, which are disposed consecutively in the peripheral direction of the combustion chamber opening, wherein the reinforcement regions of the deformation limiting elements are bent out of the plane of the deformation limiting sheet alternately towards the combustion chamber opening and away from the combustion chamber opening.

22. Cylinder head gasket according to claim 1, wherein at least one deformation limiting element has several reinforcement regions, which are bent out of the plane of the deformation limiting sheet in different directions.

23. Cylinder head gasket according to claim 1, wherein a separating line of at least one reinforcement region continues into a region of the deformation limiting sheet that is not bent out of the plane of the deformation limiting sheet.

24. Cylinder head gasket according to claim 1, wherein the separating line of at least one reinforcement region is closed in a ring shape and the region of the deformation limiting sheet surrounded by the separating line has been separated from the deformation limiting sheet.

25. Cylinder head gasket according to claim 1, wherein the opening formed by the reinforcement region of the at least one deformation limiting element being bent out of the plane of the deformation limiting sheet forms part of a larger opening in the deformation limiting sheet.

26. Cylinder head gasket according to claim 1, wherein besides the combustion chamber opening or besides the combustion chamber openings, the cylinder head gasket comprises at least one further opening, that at least one gasket sheet of the cylinder head gasket is provided with an additional bead surrounding the further opening and that the cylinder head gasket comprises an additional deformation limiting means for the additional bead.

27. Cylinder head gasket according to claim 26, wherein the additional deformation limiting means is disposed on the deformation limiting sheet.

28. Cylinder head gasket according to claim 26, wherein the additional deformation limiting means comprises at least one deformation limiting element, which has at least one reinforcement region, which is formed by bending a region of the deformation limiting sheet out of the plane of the deformation limiting sheet.

29. Cylinder head gasket according to claim 26, wherein the additional opening is a fastening element opening.

30. Cylinder head gasket according to claim 1, wherein at least one gasket sheet of the cylinder head gasket is provided with a boundary bead running along the outer edge of the gasket sheet, and that the cylinder head gasket comprises an edge deformation limiting means for the boundary bead.

31. Cylinder head gasket according to claim 30, wherein the edge deformation limiting means is disposed on the deformation limiting sheet.

32. Cylinder head gasket according to claim 30, wherein the edge deformation limiting means has at least one deformation limiting element, which has at least one reinforcement region, which is formed by bending an edge region of the deformation limiting sheet out of the plane of the deformation limiting sheet.

33. Cylinder head gasket, comprising
at least one beaded gasket sheet, which comprises a single or multiple combustion chamber openings and a bead, which may be vertically deformed and surrounds at least one of said combustion chamber openings, and
at least one deformation limiting means adjacent to the bead, wherein the deformation limiting means comprises at least one deformation limiting element disposed on a deformation limiting sheet of the cylinder head gasket, said deformation limiting element having at least one reinforcement region, which is spaced from said single or each of said multiple combustion chamber openings so as not to form any part of said single or multiple combustion chamber openings and which comprises a partially separated and bent region of the deformation limiting sheet connected to the deformation limiting sheet as a part thereof, the deformation limiting sheet having an opening beside the partially separated and bent region.

34. Cylinder head gasket according to claim 1 wherein said deformation limiting sheet includes an unbent web region between said reinforcement region and said single or each of said multiple combustion chamber openings.

35. Cylinder head gasket according to claim 1 wherein said deformation limiting sheet includes an opening between said reinforcement region and said single or each of said multiple combustion chamber openings and further includes an unbent web region between said opening and said single or each of said multiple combustion chamber openings.

* * * * *